United States Patent [19]

Bingham

[11] Patent Number: 4,763,985

[45] Date of Patent: Aug. 16, 1988

[54] RETROREFLECTIVE SHEET WITH ENHANCER BRIGHTNESS

[75] Inventor: Wallace K. Bingham, North St. Paul, Minn.

[73] Assignee: Minnesota Mining and Manufacturing Company, St. Paul, Minn.

[21] Appl. No.: 891,562

[22] Filed: Aug. 1, 1986

[51] Int. Cl.[4] .................. G02B 5/128; G02B 5/13; G02B 1/10; G02B 5/28

[52] U.S. Cl. .................. 350/105; 350/106; 350/165; 350/166

[58] Field of Search .............. 350/104, 105, 106, 164, 350/165, 166

[56] References Cited

U.S. PATENT DOCUMENTS

| Re. 30,892 | 3/1982 | Bingham et al. | 428/241 |
|---|---|---|---|
| 2,407,680 | 9/1946 | Palmquist et al. | 350/105 |
| 2,567,233 | 9/1951 | Palmquist et al. | 350/105 |
| 3,005,382 | 11/1957 | Weber | 350/105 |
| 3,172,942 | 11/1959 | Berg | 350/105 |
| 3,190,178 | 6/1961 | McKenzie | 350/105 |
| 3,567,307 | 3/1971 | Rideout et al. | 350/105 |
| 3,700,305 | 10/1972 | Bingham | 350/105 |
| 3,758,192 | 9/1973 | Bingham | 350/105 |
| 4,025,159 | 5/1977 | McGrath | 350/105 |

Primary Examiner—John K. Corbin
Assistant Examiner—Ronald M. Kachmarik
Attorney, Agent, or Firm—Donald M. Sell; James A. Smith; Robert H. Jordan

[57] ABSTRACT

Retroreflective construction comprising a monolayer of microspheres with associated dielectric mirrors which are hemispherically surrounded by tangentially-oriented, preferably contour-conforming, reflective pigment nacreous flakes. The dielectric mirrors and reflective nacreous pigment flakes cooperate additively substantially without interfering with each other to provide a high brightness retroreflective sheet. The novel sheets retain much of their reflectivity after several launderings or drycleanings and, in some embodiments, can be made very flexible, making them well-suited for use as reflective fabrics.

18 Claims, 2 Drawing Sheets

RETROREFLECTIVE SHEET WITH ENHANCER BRIGHTNESS

FIELD OF THE INVENTION

This invention relates to a retroreflective sheet containing microsphere-based retroreflective elements which may be used in retroreflective signs, fabrics, or transfer films.

BACKGROUND

One common type of retroreflective construction contains small spherical lens elements, such as glass microspheres, and either diffusely or specularly reflecting material adjacent the rear surface thereof, the selection of refractive indices of the microspheres and positioning of the respective components being made in a known manner to provide maximum retroreflective efficiency. In almost all commercial retroreflective constructions having a sheet form the specularly reflective material is a metal, i.e., a vapor-coated layer of specularly reflective aluminum arranged behind the microspheres, either directly on the microsphere, as taught in U.S. Pat. No. 3,005,382 (Weber) or U.S. Pat. No. 3,190,178 (McKenzie), or spaced from the microspheres by a spacing layer as taught in U.S. Pat. No. 2,407,680 (Palmquist et al.). Alternatively, specularly reflecting metal flakes can be contained in the binder, as disclosed in U.S. Pat. No. 2,567,233 (Palmquist et al.).

Unfortunately, metallic specular reflectors have several serious disadvantages, one of which is that the color of the light reflected from a retroreflective construction using such a reflector is not readily controlled, and a brilliant white appearance is difficult to achieve, especially when aluminum is used. Colored effects are generally limited to the peculiar color characteristics of the available specular reflecting materials, unless color is introduced into the microspheres or is contained in a top-coating over the microspheres. Also, aluminum is subject to corrosion.

The limitations on obtaining retroreflective sheeting colored other than gray is a problem especially in reflectorizing fabrics. Reflective and retroreflective sheeting and fabrics have been proposed as a means to provide greater visibility, and therefore improved safety, to pedestrians or cyclists traveling along streets or highways at nighttime. For example, U.S. Pat. No. 2,567,233 (Palmquist et al.) discloses a flexible, weather-resistant sheet comprising a layer of transparent microlenses which are partially embedded in a resilient light reflective binder pigmented with metal flakes. The sheets may be provided with an adhesive on the back side in order to be bonded to various substrates such as garments, fabric, wood, and metal. Such sheets, however, have an unappealing gray color and a brightness of typically about 40 candella per square meter per lux. U.S. Pat. No. 3,172,942 (Berg) discloses a retroreflective transfer film, also gray, which is applied to fabric articles with a hot iron. U.S. Pat. No. Re. 30,892 (Bingham et al.) discloses a method for retroreflective treatment of fabric whereby minute retroreflective particles supported in a softenable binder material are deposited onto the fabric in a sparsely spaced manner. The latter binder material is softened during application to provide adhesion of the particles to the fabric. While these known retroreflective fabric treatments are useful for some applications, they do not generally have as high a brightness as is desired for some uses.

In addition to metals, other specularly reflective materials have been proposed. For instance, U.S. Pat. No 3,700,305 (Bingham) discloses retroreflective construction containing microspheres with adjacent dielectric mirrors. The dielectric mirrors are made up of a contiguous array of materials, at least one being a layer form, having an alternating sequence of refractive indices, all except the material furthermost from the microspheres necessarily being transparent. U.S. Pat. No. 3,758,192 (Bingham) discloses retroreflective constructions containing a monolayer of microspheres which are substantially hemispherically surrounded by a binder containing specularly reflective nacreous pigment particles.

SUMMARY OF THE INVENTION

The present invention provides a novel retroreflective sheet that combines desired coloration with enhanced or high reflective brightness, and which may be adhered to fabrics or other substrates. Sheets of the invention typically have a reflectivity of about 250 to 300 candella per square meter per lux, and good angularity, i.e., typically a half-brightness entrance angle of between about 40° to 45°. (The half-brightness entrance angle is the incidence or entrance angle at which the reflective efficiency of the sheet is one-half its efficiency along an entrance angle essentially normal to the plane of the retroreflective surface). The novel sheet can be made in very supple form which facilitates its use as a transfer sheet to create reflective fabrics with excellent drape or hand, i.e., fabrics which are easily bent, creased, and folded without an excessive stiffness which might render clothing uncomfortable to wear. The sheet can be made in various colors, such as a brilliant white or variety of bright colors. The novel sheet can be made very durable, and as such will retain high retroreflective efficiency even after several launderings or drycleanings of the fabric to which it is applied, e.g., for safety purposes, making the sheet particularly useful in clothing. Sheets of the invention are not subject to metal corrosion, as are, for instance, retroreflective sheets having aluminum specularly reflecting members.

Briefly summarizing, the novel retroreflective sheet comprises a monolayer of transparent, preferably glass, microspheres, such as are conventionally used in retroreflective materials. Associated with each microsphere, in optical connection therewith, is a transparent, specular reflector such as a dielectric mirror similar to the type disclosed in U.S. Pat. No. 3,700,305. The dielectric mirrors conform substantially to the contour of the microspheres. The microspheres and associated dielectric mirrors are approximately hemispherically embedded and firmly bonded in a base layer containing a substantially transparent binder material and reflective nacreous pigment flakes, such as disclosed in U.S. Pat. No. 3,758,192. The reflective nacreous pigment flakes are substantially tangentially oriented about the embedded portions of the microspheres and associated dielectric mirrors and are preferably conformed to the contour thereof in a cup-like fashion as described hereinafter. The binder material may be clear, thereby providing a substantially white sheet, or may contain a dye to provide a colored sheet. Typically, the sheet further comprises a transfer adhesive applied to the backside thereof by which it may be adhered to a desired substrate. If such a transfer adhesive is provided, a suitable release liner, e.g., a polyethylene sheet, is generally provided to protect the adhesive prior to the adherence of the retroreflective sheet to the substrate.

Surprisingly, the dielectric mirrors and reflective nacreous pigment flakes cooperate essentially additively to provide a retroreflective sheet with enhanced brightness. Surprisingly, although the reflective nacreous pigment flakes are disposed behind the dielectric mirrors, and any light reflected by the reflective nacreous pigment flakes must pass through the dielectric mirrors at least twice in order to be reflected by the sheet and therefore visible to an observer, the dielectric mirrors and reflective nacreous pigment flakes apparently cooperate essentially without interfering with the reflective efficiency of one another.

Other useful embodiments of the novel sheet include an embedded-lens embodiment wherein the front surfaces of the microspheres, instead of being exposed, are embedded in a flattop transparent layer, as disclosed in U.S. Pat. No. 2,407,680 (Palmquist). Also included is a cellular, encapsulated-lens embodiment wherein a transparent cover film is disposed in spaced relation in front of the microspheres and a network of narrow, intersecting bonds extends over the surface of the base layer to adhere the base layer and cover film together and to divide the space between the base layer and cover film into hermetically sealed cells or pockets in which the front surfaces of the microspheres have an air interface, as disclosed in U.S. Pat. No. 3,190,178 (McKenzie). Such embodiments are useful in environments where it is desirable for a sheet to be retroreflective even if wet.

BRIEF DESCRIPTION OF DRAWING

In the accompanying drawing.

These Figures, which are not to scale, are only descriptive and are intended to be nonlimiting. For instance, the microspheres need not be of uniform diameter or packed uniformly to achieve the advantages of this invention, and have been shown as such merely for clarity.

DETAILED DESCRIPTION OF INVENTION

Figure 1:
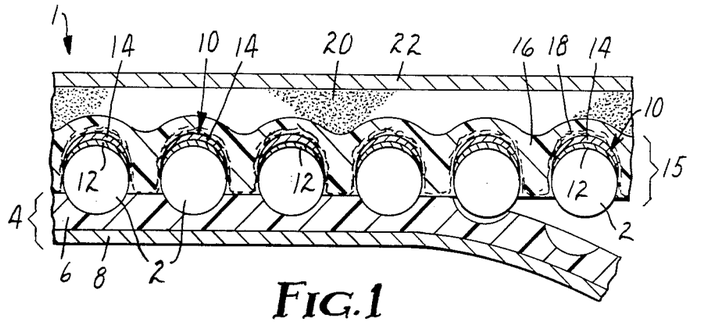
FIG. 1 shows, in schematic cross-section, one embodiment of the novel retroreflective sheet of the invention with a temporary carrier sheet partially removed.

With reference to FIG. 1, a preferred embodiment of the novel retroreflective sheet 1 may be made by first arranging the transparent microspheres 2 in substantially a monolayer on a temporary carrier sheet 4. The carrier sheet 4 typically comprises a polymeric coating 6 on a stiff backing 8, such as kraft paper. The polymeric coating 6 is a softenable material, such as by heat, into which the microspheres 2 are embedded. Suitable materials include polyalkylenes such as polyethylene, polypropylene, and polybutylene; polyesters such as polyethylene terephthalate; polyvinyl chloride; polysulfones; and the like.

The microspheres 2 are preferably packed as closely as possible, ideally in their closest cubic arrangement, to achieve greater brightness and may be so arranged by any convenient transfer process, such as printing, transferring, screening, cascading, or with a hot can roll.

The microspheres 2 are preferably glass because of its high durability. Preferably, the microspheres 2 will have an average diameter of between about 60 and 75 microns, although microspheres having diameters from about 30 to 150 microns will typically be useful for fabric applications. Sheets comprising larger microspheres may tend to be less supple, an important factor if the sheet is to be used to make a retroreflective fabric. Sheets comprising microspheres having diameters substantially smaller than about 25 microns may tend to be less bright because of diffraction losses as the diameter of the microspheres approaches the wavelength of the light being reflected. Ideally, the microspheres will have substantially uniform diameters thereby enabling better control of the coating steps described hereinafter and resulting in a sheet with substantially uniform brightness and angularity.

Typically, microspheres 2 with a refractive index between about 1.8 and about 2.0 are preferred for sheets where the front surfaces of the microspheres are exposed to an air interface, with those at about 1.90 to 1.93 being most preferred. Microspheres having a refractive index between about 1.4 and about 2.7, however, may be useful depending upon the application. For instance, if the surfaces of the microspheres are wet with water, then microspheres having a refractive index of about 2.5 or greater provide the most efficient retroreflection. Accordingly, it may be desirable to utilize a mixture of 1.9 and 2.5 or greater refractive index microspheres in preparing retroreflective sheets of the invention which are to be applied to articles of apparel such as rainwear.

The microspheres 2 are typically embedded in the carrier sheet 4 to a depth equal to from about 15 to about 50 percent of their average diameter, and preferably to between about 20 to 40 percent of their average diameter. If the microspheres are embedded to substantially less than 15 percent of their diameter, many of them may be dislodged during subsequent preparation of the retroreflective sheet. Contrarily, if embedded to substantially more than 50 percent of their diameter, the angularity of the resultant sheet may tend to be reduced, and many of the elements tend to be too easily dislodged from the final product.

Disposed adjacent to the rear surface of each microsphere 2 is a transparent dielectric mirror 10 similar to the type disclosed in U.S. Pat. No. 3,700,305, which is incorporated herein by reference.

The dielectric mirrors 10 comprise one or more, typically two succeeding layers 12, 14 of varying refractive indices which are individually deposited, typically via a vacuum vapor coating process. The layers of alternating refractive index are typically deposited directly upon, approximately hemispherically covering, the rear surface of the microspheres. The faces of layer 12, which has a refractive index of $n_1$, are in contact with layer 14 which has a refractive index of $n_3$ and microsphere 2 which has a refractive index of $n_2$. Both $n_2$ and $n_3$ are at least 0.1, and preferably at least 0.3, either higher or lower than $n_1$. When $n_1$ is higher than both $n_2$ and $n_3$, $n_1$ is preferably in the 1.7 to 4.9 range, and $n_2$ and $n_3$ are preferably in the 1.2 to 1.7 range. Conversely, when $n_1$ is lower than both $n_2$ and $n_3$, $n_1$ is preferably in the 1.2 to 1.7 range, and $n_2$ and $n_3$ are preferably in the 1.7 to 4.9 range. Preferably, each layer 12, 14 of the dielectric mirror 10 is clear or essentially colorless to minimize light absorption and maximize light reflection, however, a great variety of visual effects may be achieved, if desired, when one or more of the layers are colored, such as with a dye. Such coloring agent, if provided, preferably leaves the dielectric mirror substantially transparent.

Examples of compounds within the desired refractive index ranges that may be used include: high index materials such as $CdS$, $CeO_2$, $CsI$, $GeAs$, $Ge$, $InAs$, $InP$, $InSb$, $ZrO_2$, $Bi_2O_3$, $ZnSe$, $ZnS$, $WO_3$, $PbS$, $PbSe$, $PbTe$, $RbI$, $Si$, $Ta_2O_5$, $Te$, and $TiO_2$; and low index materials such as $Al_2O_3$, $AlF_3$, $CaF_2$, $CeF_2$, $LiF$, $MgF_2$, $Na_3AlF_6$, $ThOF_2$, $SiO_2$, and elastomeric copolymers of perfluoropropylene and vinylidene fluoride (refractive index of about 1.38). Preferably, dielectric materials which are substantially water-insoluble are used.

Successive depositions are performed to provide the desired number of layers of alternating refractive index which make up the dielectric mirror 10 on each microsphere 2. Each transparent layer 12, 14 has an optical thickness, i.e., its actual thickness multiplied by its refractive index, corresponding to an odd numbered multiple, i.e., 1, 3, 5, 7, ..., of about one-quarter wavelength of light in the wavelength range of about 3,800 to about 10,000 angstroms. Preferably, the specularly reflecting layers are deposited in substantially uniform thickness on at least a hemisphere of each microsphere, i.e., the portion of the microsphere which is exposed rather than embedded in the carrier sheet 4, to achieve maximum angularity.

The preferred thickness of each layer may range from about 250 angstroms to several thousand angstroms depending upon which material is used. For instance, for a layer of $Na_3AlF_6$, the preferred optical thickness range is typically between about 725 and about 1450 angstroms whereas for a layer of $ZnS$, the preferred optical thickness range is typically between about 425 and about 850 angstroms. The preferred compositions for the transparent mirrors for a particular application are determined by the best combination of refractive index, stability, cost, durability, and retroreflective efficiency, and may be readily determined by trial and error. For instance $MgF_2$ and $CeO_2$ are typically more durable and resistant to laundering than $Na_3AlE_6$ and $ZnS$, respectively, but are also more expensive.

The optimum combination of reflective efficiency and cost is usually achieved with a transparent mirror 10 comprising two layers 12, 14 of alternating refractive index although three or more layers may be deposited to increase the retroreflective efficiency achieved. For example, a reflective sheet of the invention comprising four alternating layers of $Na_3AlF_6$ and $ZnS$ may attain over 90 percent retroreflective efficiency.

A base layer 15 comprising a dispersion of a resinous binder 16 and reflective nacreous pigment flakes 18, as described in U.S. Pat. No. 3,758,192, which is incorporated herein by reference, is next coated over the microlenses 2 and associated dielectric mirrors 10. The binder/pigment dispersion is applied at wet thickness of from about 1 to about 100 mils (about 25 to about 2500 microns) by known techniques such as knife coating.

The binder 16 should have reasonably good exterior durability, and form a strong bond to the microspheres 2, dielectric mirrors 10, and nacreous pigment flakes 18 so that the microspheres 2 will resist dislodgment from the final product by rubbing or scraping. If the sheet is to be applied to a fabric or similar article, the binder 16 should also be capable of repeated flexing without cracking or breaking the bonds. Resins suitable for use as binders include aliphatic and aromatic polyurethanes, polyesters, polyvinyl acetate, polyvinyl chloride, acrylics or combinations thereof. Typically used solvents include ketones such as methyl ethyl ketone or cyclohexanone, and aromatic hydrocarbons such as toluene or xylene which will dissolve the resin.

The binder 16 is preferably clear and relatively colorless to achieve maximum reflective efficiency. If desired, however, transparent coloring agents may be incorporated therein to impart a colored appearance, such as red or blue, to the sheet. Alternatively, an effective amount of $TiO_2$ or other whitening agent may be incorporated therein to give the sheet a more brilliant white appearance, or if desired, a fluorescent pigment may be incorporated therein. Non-transparent coloring agents such as pigments should only be used in limited qualities because they may reduce the transparent clarity of the binder 16 and thereby reduce the reflective efficiency of the nacreous flakes 18 dispersed therein.

Nacreous pigments 18 are well known in the art, with several manufacturers now supplying synthetic pigments. The nacreous pigment flakes used in this invention should be at least transluscent and are preferably substantially transparent. Suitable materials include $BiOCl_2$, hexagonal $PbCO_3$, and guanine from fish scales. In general, such pigment flakes are available in several grades and carefully controlled size ranges.

Nacreous pigment flakes 18 whose broadest dimension is from about 5 to about 80 microns are generally useful in the invention while those whose broadest dimension is between about 8 and about 30 microns are preferred. Preferably the maximum dimension of the flakes is less than the diameter of the microspheres. After the dispersion is coated, nacreous pigment flakes 18 of the designated size range tend to individually settle and orient or arrange themselves with their broadest surfaces in approximately tangential orientation to, preferably in at least partial contact with, the microspheres 2 and associated dielectric mirrors 10, and preferably bend through their broadest dimension to conform to the contour thereof in a cup-like fashion, thereby providing good retroreflective efficiency. Nacreous pigment flakes 18 which are less than about 200 millimicrons thickness will generally be useful while those between about 30 and 60 millimicrons in thickness are preferred because such flakes will most readily conform to the contour of a microsphere 2 of the preferred size range and associated dielectric mirror 10 in the preferred cup-like fashion to provide the greatest retroreflective efficiency. As the size of the nacreous pigment flakes 18 decreases to below about 10 microns in the broadest dimension, there may be less tendency for the flakes to orient and contact the dielectric mirrors 10 and microspheres 8 in the just described manner, and they therefore provide less efficient retroreflection. If the average nacreous pigment flake 18 size is below five microns, apparently many of the flakes 18 will tend to orient themselves such that their edges rather than their major surfaces contact the surface of the microspheres 2, thereby resulting in more scattering of light, and less efficient retroreflecting structure.

Figure 2:
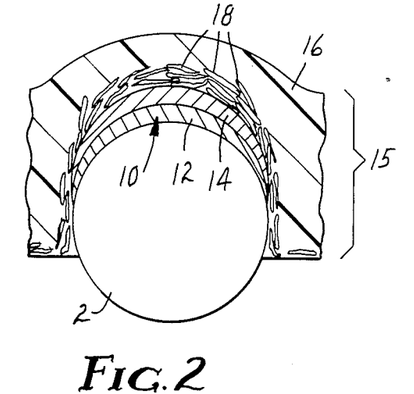
FIG. 2 is an enlarged view of a single microsphere and associated structure from the embodiment illustrated in FIG. 1.

FIG. 2 shows a single microsphere 8 and the dielectric mirror 10 on the rear surface thereof, which are partially embedded in a binder 16 containing reflective nacreous pigment flakes 18 which have conformed to the contour thereof.

The binder/pigment dispersion should comprise between about 8 and about 35 weight percent of nacreous pigment 18 based on the total vehicle solids, i.e., all of the solids in the base layer including resin, dryer(s), coloring agents, etc., and preferably comprises about 15 percent by weight of nacreous pigment. Dispersions containing less than about 8 weight percent of nacreous pigment 18 may not provide the desired reflectivity whereas incorporating more than about 35 weight percent of nacreous pigment 18 in the dispersion typically results in only small increases in reflectivity and may begin to interfere with the formation of a strong binder matrix.

The binder/pigment dispersion preferably contains about 10 to about 20 weight percent of total solids with the remainder being solvent. If a dispersion with a substantially higher solids content is coated, the nacreous pigment flakes 18 may not settle upon the microlenses 2 and associated dielectric mirrors 10 correctly to permit "leafing", i.e., the overlapping deposit of several nacreous pigment flakes upon each other in a multiplicity of layers, so that a substantial number of the, at least partially, light transmissive platelets 18 may form an effective reflective layer in the preferred conforming, cup-like tangential orientation about the microspheres 2 and associated dielectric mirrors 10.

Figure 3:
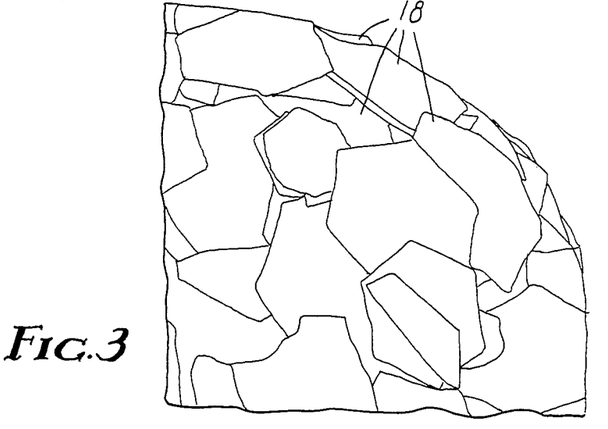
FIG. 3 shows, in perspective view, and in even further enlarged manner, a portion of a microsphere and the reflective pigment flakes from the embodiment shown in FIGS. 1 and 2.

FIG. 3 shows, in perspective view, a portion of a microsphere 2 and the reflective pigment flakes 18 arranged on the surface thereof. The flakes 18 are oriented with their broadest surface to the microsphere 2 and dielectric mirror 10, conforming to the contours thereof and overlapping each other or "leafing".

The binder/pigment dispersion is preferably coated at a wet thickness of between about 2 and 15 mils (about 50 to 375 microns), and ideally at about 3 to 4 mils (about 75 to 100 microns). Thinner coatings may tend to contain too few nacreous pigment flakes 18 to provide the desired multiplicity of leafed flakes deposited upon each other to provide the desired reflectivity. The nacreous pigment flakes 18 in thicker coatings may tend to orient themselves in other than the preferred tangential, cup-like conforming orientation, and therefore may not provide the desired reflectivity.

After the binder/pigment dispersion has been coated, the sheet is dried, such as in an oven, to remove the solvent from the base layer 15.

With reference again to FIG. 1, finally, a layer of transfer adhesive 20 may be provided over the base layer 15. Such an adhesive 20 enables the novel sheet to be applied to various substrates, such as fabrics. Suitable adhesives include acrylate based compounds and others which will adhere firmly to both the binder 16 and desired substrate (not shown). A thermoplastic adhesive may be used so that a retroreflective sheet of the invention may be applied to a substrate with the application of heat, such as an iron-on transfer which is applied to an article of clothing. Typically, the transfer adhesive 20 will be covered with a protective release liner 22, usually comprising a polymer film, e.g., polyethylene, which protects the transfer adhesive 20 until the release liner 22 is removed and the retroreflective sheet 1 is applied to a substrate.

The carrier sheet 4 is shown partially removed in FIG. 1. It may be removed to expose the front surfaces of the microspheres 2 at some convenient time such as after the transfer adhesive 20 and release liner 22 are applied or after the retroreflective sheet has been adhered to a substrate.

Figure 4:
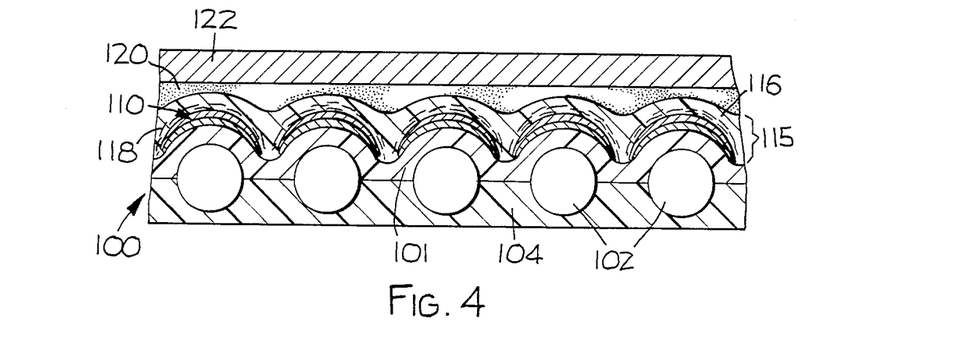
FIG. 4 shows, in schematic cross-section, an embedded-lens embodiment of the retroreflective sheet of the invention.

FIG. 4 illustrates in cross-section a portion of an embedded-lens embodiment of the invention. Retroreflective sheet 100 comprises a transparent spacer layer 101 disposed between microspheres 102 which are arranged in substantially a monolayer and associated transparent specular reflectors 110. Base layer 115, containing binder 116 and reflective nacreous pigment flakes 118, and flattop transparent layer 104 in which the front surfaces of microspheres 102 are partially embedded are also shown Sheeting 100 has been bonded to fabric 122 with adhesive 120.

Other embodiments of the novel retroreflective sheet may be made in accordance with the teaching of this invention. For instance, after removing the carrier sheet a cover film may be laid across the exposed surfaces of the microspheres then adhered to the sheet by embossing the sheet in a patterned fashion so as to extrude the binder from the base layer into adherent contact with the cover film, to thereby form a network of narrow intersecting bonds extending between the base layer and the cover film which adhere them together, and to form a plurality of cells within which microspheres having an air interface are hermetically sealed. The provision of such cover films on retroreflective sheeting is disclosed in U.S. Pat. No. 3,190,178 (McKenzie). In making cellular embodiments, it will typically be desirable to provide a layer of flowable, e.g., by heating, adhesive on the side of the base layer opposite the monolayer of microspheres. Such adhesive, which is pushed through the base layer around microspheres into contact with the cover film according to the embossing pattern, should be selected to bond securely to the cover film and other components of the sheet, is preferably pigmented in accordance with the desired color of the sheet, and may be radiation curable. For instance, U.S. Pat. No. 4,025,159 (McGrath), discloses acrylic-based ingredients that are useful bond materials (Col. 4, lines 57-58). The reflectivity of cellular encapsulated-lens sheets is typically lower than that of exposed-lens sheets because the microspheres in the areas of the bonds between the cover film and base layer, typically comprising between about 20 and 40 percent of the surface area of a sheet, are substantially completely surrounded by the bond material and therefore do not possess the optical relationships necessary for effective retroreflection. However, such sheets will retain their reflectivity even when wet.

Figure 5:
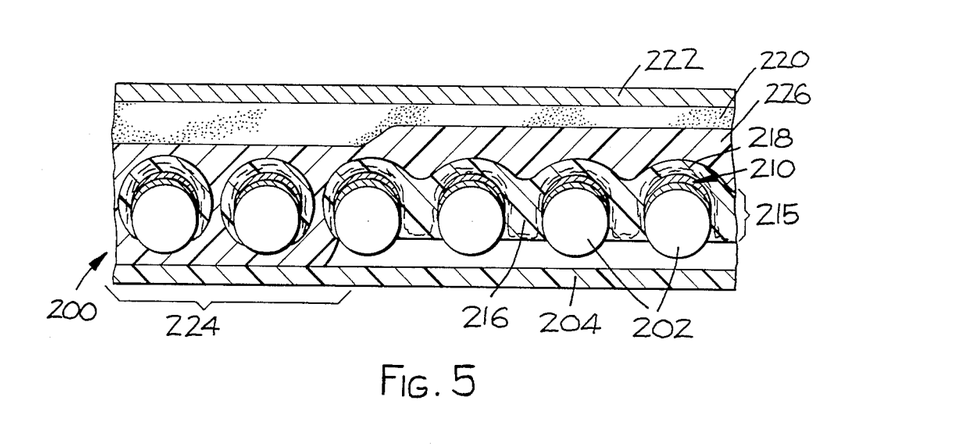
FIG. 5 shows, in schematic cross-section, an encapsulated-lens embodiment of the retroreflective sheet of the invention.

A cross-section of a portion of such an encapsulated-lens embodiment is illustrated in FIG. 5 wherein is shown sheet 200 which comprises microspheres 202 which are arranged in substantially a monolayer, associated transparent specular reflectors 210, reflective nacreous pigment flakes 218, and cover film 204. Cover film 204 is disposed in spaced arrangement in front of the microspheres by a network of narrow intersecting bonds 224. Bonds 224 may be formed as described in the preceding paragraph, e.g., by forcing flowable adhesive 226 through base layer 215 between microspheres 202 into contact with cover film 204. If desired, transfer adhesive 220 and release liner 222 may then be applied to the back of encapsulated-lens retroreflective sheeting 200.

The invention will now be further explained by the following examples which are intended to be nonlimiting. In each example, the reflectivity of the sheet produced was determined by measuring with a photoelectric cell the brightness of reflected light at an observation angle of 0.2° from the incidence angle of a known source light beam, according to ASTM E809. Unless otherwise indicated, the incidence or entrance angle of the source light to the sheet was about 4° from normal to the surface of sheet.

EXAMPLE 1

Glass microspheres having a refractive index of about 1.93 and diameters ranging from about 45 to about 70 microns were cascaded in a monolayer onto a carrier sheet comprising a web of paper coated on one side with low density polyethylene. The microspheres, which were packed in essentially their closest cubic arrangement, were embedded in the polyethylene to a depth of approximately 30 percent of their diameters by heating the web to 280° F. (140° C.). The exposed sides of the microspheres were then vacuum vapor coated with $Na_3AlF_6$ to form a first dielectric layer having a refractive index of about 1.35 to 1.39, and then vacuum vapor coated with ZnS to form a second dielectric layer having a refractive index of about 2.35, both layers being about one-quarter wavelength in optical thickness for light having a wavelength of 5900 angstroms.

A binder/nacreous pigment dispersion of the following formulation:

| Component | Parts by Weight |
| --- | --- |
| Estane 5703 (a high molecular weight polyurethane binder resin comprising an aromatic diisocyanate and a polyester, available from B. F. Goodrich Co.) | 15.0 |
| Vinylite VMCH (a binder resin comprising a vinyl chloride/vinyl acetate copolymer, having a monomeric weight ratio of 86:13, and 1 weight percent of interpolymerized maleic acid, available from Union Carbide Chemical Corp.) | 4.5 |
| VCG 630 (a nacreous pigment paste comprising 60 percent by weight hexagonal-shaped lead carbonate crystals, 33 percent by weight of methyl isobutyl ketone, and 7 percent by weight of vinyl chloride polymer, available from EM Chemical Co. of Hawthorn, New York) | 15.5 |
| Methyl Ethyl Ketone | 27.0 |
| Cyclohexanone | 10.0 |
| Toluene | 28.0 | was knife coated over the coated monolayer of microspheres at approximately 5 mils (125 microns) wet thickness. This construction was dried at 150° F. (65° C.) for 5 minutes and at 200° F. (90° C.) for 10 minutes.

An adhesive layer comprising:

| Component | Parts by Weight |
| --- | --- |
| Rhoplex HA-8 (an adhesive resin comprising an aqueous emulsion of 54 weight percent of water and 46 weight percent of an ethyl acrylate/methylol acrylamide copolymer, available from Rohm & Haas Co.) | 92.13 |
| Foamaster DF 160L (an antifoam agent, available from Diamond Shamrock Co.) | 0.25 |
| Acrysol ASE 60 (a thickening agent comprising an emulsion of a copolymer of ethyl methacrylate and acrylic acid, available from Rohm & Haas Co.) | 2.21 |
| Ammonium Nitrate | 0.51 |
| Ammonium Hydroxide | 0.30 |
| Water | 4.60 | was applied over the binder layer at a wet thickness of approximately 14 mils (350 microns). The sheet was then dried at 90° F. (30° C.) for 4 minutes to a tacky state then laminated directly to a cotton/polyester (35%/65%) blend broadcloth before being further dried at 150° F. (65° C.) for 5 minutes and then 250° F. (120° C.) for 10 minutes.

The carrier sheet was then removed to yield the resulting product, a white, very flexible fabric which was found to have a reflectivity of 275 candella per square meter per lux.

EXAMPLE 2

A monolayer of microlenses was embedded in a carrier sheet and vapor coated with a layer of $Na_3AlF_6$ and a layer of ZnS as described in Example 1.

A binder base comprising:

| Component | Parts by Weight |
| --- | --- |
| Hycar 1072 (a butadiene/acrylonitrile rubber, available from B. F. Goodrich Co.) | 20.0 |
| Vinylite VAGH (a binder resin comprising a vinyl chloride/vinyl acetate copolymer, having a monomeric weight ratio of 86:13, and 1 weight percent of interpolymerized maleic acid, available from Union Carbide Chemical Corp.) | 6.6 |
| Methyl Ethyl Ketone | 26.8 |
| Methyl Isobutyl Ketone | 20.0 |
| n-Butyl Acetate | 20.0 |
| Toluene | 6.6 | was prepared and mixed as follows:

| Component | Parts by Weight |
| --- | --- |
| Binder Base | 62.5 |
| VCG 630 | 12.5 |
| Methyl Ethyl Ketone | 25.0 | to yield a binder/nacreous pigment dispersion which was knife coated over the coated microspheres at approximately 4 mils (100 microns) wet thickness. This construction was dried at 150° F. (65° C.) for 5 minutes and at 200° F. (90° C.) for 10 minutes.

An adhesive layer comprising 100 parts by weight of the following:

| Component | Parts by Weight |
| --- | --- |
| Estane 5713 (a crystalline, high molecular weight polyester-based polyurethane resin, available from B. F. Goodrich Co.) | 55.0 |
| N,N—dimethylformamide | 23.0 |
| Methyl Ethyl Ketone | 22.0 | and 60 parts by weight of the following:

| Component | Parts by Weight |
| --- | --- |
| Estane 5713 | 11.2 |
| OR-600 (a rutile titanium dioxide white pigment, available from American Cyanamid Corp.) | 28.7 |
| Methyl Ethyl Ketone | 33.8 |
| Cyclohexanone | 26.3 | was applied over the binder at a wet thickness of about 9 mils (225 microns).

The sheet obtained had an excellent white appearance and was found to have a reflectivity of about 290 candella per square meter per lux. When a section of this retroreflective construction was thermally laminated to a 4.25 ounce per square yard (34 gram per square meter) tricot knitted fabric, a polyester/nylon blend (94%/6%), it showed excellent wash durability. A sample was washed through 25 cycles in a Maytag Toploader Model A208 adjusted to its Medium Load, Regular Action, and Hot/Cold Cycle settings, with Tide detergent and 4.0 pounds, dry weight, (1.8 kilograms) of cotton fabric ballast to simulate typical laundering conditions. After washing, the sample retained a reflectivity of 125 candella per square meter per lux.

EXAMPLE 3

A monolayer of microlenses was embedded in a carrier sheet and vapor coated with a layer of $Na_3AlF_6$ and a layer of ZnS as described in Example 1.

A binder/nacreous pigment dispersion of the following formulation:

| Component | Parts by Weight |
| --- | --- |
| Estane 5703 | 12.4 |
| N,N—dimethylformamide | 14.5 |
| Vinylite VMCH | 3.9 |
| CB 75 (an aromatic polyisocyanate adduct dissolved in ethyl acetate at 75 weight percent solids, available from Mobay Chemical of Pittsburgh, Pennsylvania) | 1.0 |
| Z 6040 (a coupling agent, Gamma-glycidoxypropyltrimethoxy silane, available from Dow Corning Corp.) | 2.0 |
| VCG 630 | 15.5 |
| Methyl Ethyl Ketone | 36.7 |
| Toluene | 14.0 | was knifed coated over the coated microspheres at approximately 4 mils (100 microns) wet thickness. This construction was dried at 150° F. (65° C.) for 5 minutes and at 200° F. (90° C.) for 10 minutes.

An adhesive layer comprising:

| Component | Parts by Weight |
| --- | --- |
| Estane 5702 (a high molecular weight polyester-based polyurethane resin, available from B. F. Goodrich Co.) | 21.25 |
| N,N—dimethylformamide | 31.87 |
| Dioctyl Phthalate | 2.19 |
| OR-600 | 1.19 |
| Estane 5713 | 0.46 |
| Vinylite VYHH (a binder resin comprising vinyl chloride/vinyl acetate, having a monomeric weight ratio of 86:14, available from Union Carbide Chemical Corp.) | 3.27 |
| Methyl Ethyl Ketone | 35.89 |
| Cyclohexanone | 1.08 |
| Toluene | 2.80 | was coated over the binder/nacreous pigment dispersion at about 8 mils (200 microns) thickness and dried at 90° F. (30° C.) for 4 minutes then at 150° F. (65° C.) for 5 minutes.

After the carrier sheet was removed, this white retroreflective construction was found to have a reflectivity of 260 candella per square meter per lux.

EXAMPLE 4

A monolayer of microlenses was embedded in a carrier sheet and vapor coated with a layer of $Na_3AlF_6$ and a layer of ZnS as described in Example 1. A binder/nacreous pigment dispersion like that described in Example 3 except comprising an additional 10 percent by weight of VCG 630 nacreous pigment paste was knife coated over the coated microspheres at approximately 4 mils (100 microns) wet thickness. This construction was dried at 150° F. (65° C.) for 5 minutes and at 200° F. (90° C.) for 10 minutes.

An adhesive layer comprising:

| Component | Parts by Weight |
| --- | --- |
| Vitel VPE 5545 (a linear saturated solvent soluble polyester resin, available from Goodyear Tire & Rubber Company) | 50 |
| Methyl Ethyl Ketone | 25 |
| Toluene | 25 | was knife coated over the binder layer at a wet thickness of approximately 12 mils (300 microns). While the adhesive layer was still wet, the sheet was laminated to a 200 denier plain weave nylon fabric whereupon the entire construction was dried at 200° F. (90° C.) for 5 minutes, then at 250° F. (120° C.) for 5 more minutes.

A white, retroreflective construction was obtained which was found to have a reflectivity of 295 candella per square meter per lux. The increased reflectivity over that attained in Example 3 is believed to be the result of the increased amount of nacreous pigment paste used. This construction had a half brightness entrance angle of about 45 degrees. The construction has a tough, tear resistant backing that could be easily sewn onto a fabric substrate, such as an article of clothing.

EXAMPLE 5

A monolayer of microspheres was embedded in a carrier sheet and vapor coated with a layer of $Na_3AlF_6$ and a layer of ZnS as described in Example 1.

A binder/nacreous pigment dispersion comprising:

| Component | Parts by Weight |
| --- | --- |
| N,N—dimethylformamide | 15.7 |
| Estane 5703 | 12.4 |
| Vinylite VMCH | 4.1 |
| VCG 630 | 15.8 |
| Estane 5713 | 0.1 |
| YT 8801 (3,3',-dichlorobenzidine coupled to o-acetoacetanisidide, a yellow pigment, available from BASF Wyandotte Corp.) | 0.4 |
| Methyl Ethyl Ketone | 37.3 |

-continued

| Component | Parts by Weight |
|---|---|
| Toluene | 14.2 | was knife coated over the coated microspheres at about 4 mils (100 microns) wet thickness. The sheet was then dried at 200° F. (90° C.) for 10 minutes.

An adhesive layer comprising:

| Component | Parts by Weight |
|---|---|
| Estane 5713 | 18.0 |
| OR-600 | 8.6 |
| Methyl Ethyl Ketone | 42.2 |
| Cyclohexanone | 31.2 | was knife coated thereon at about 8 mils (200 microns) wet thickness. The sheet was dried at 150° F. (65° C.) for 5 minutes then at 200° F. (90° C.) for 5 minutes.

The construction obtained had a yellow appearance under ambient, diffuse light conditions. However, when viewed retroreflectively, it had a white appearance and was found to have a reflectivity of about 270 candella per square meter per lux. With a hand iron set at the "Wool" heat setting, the sheet could be adhered to a desired substrate, e.g., a piece of fabric, an article of clothing, etc., with no loss of reflectivity.

EXAMPLE 6

A monolayer of microspheres was embedded in a carrier sheet and vapor coated as described in Example 1.

A binder/nacreous pigment dispersion comprising:

| Component | Parts by Weight |
|---|---|
| Carbopol 940 (a carboxy polymethylene resin, available from B. F. Goodrich Chemical Group) | 0.5 |
| Acrysol ASE 60 | 0.3 |
| Foamaster DF 160L | 0.2 |
| Rhoplex HA-8 | 31.6 |
| Dowicide A (sodium salt of o-phenylphenol, available from Dow Chemical Co.) | 0.2 |
| 4038 Water Dispersed Pearl (a 50 percent slurry of hexagonally shaped lead carbonate crystals dispersed in de-mineralized water, available from J. Mazzacca Corp. of Wayne, New Jersey) | 17.0 |
| Ammonium Nitrate | 0.1 |
| Ammonium Hydroxide | 0.2 |
| Water | 49.9 | was knife coated thereon at about 5 mils (125 microns) wet thickness. The sheet was dried at 150° F. (65° C.) for 10 minutes then at 225° F. (110° C.) for 10 minutes.

An adhesive composition comprising:

| Component | Parts by Weight |
|---|---|
| Rhoplex HA-8 | 92.13 |
| Foamaster DF 160L | 0.25 |
| Acrysol ASE 75 (a thickening agent comprising an emulsion copolymer of ethyl methacrylate and acrylic acid, available from Rohm and Haas Co.) | 2.21 |
| Ammonium Nitrate | 0.51 |
| Ammonium Hydroxide | 0.30 |

-continued

| Component | Parts by Weight |
|---|---|
| Water | 4.60 | was knife coated over the binder/nacreous pigment coating at a wet thickness of approximately 12 mils (300 microns). The sheet was dried at 85° F. (30° C.) for 3 minutes to a tacky state, then laminated to a cotton/polyester blend (35%/65%) broadcloth and dried at 150° F. (65° C.) for 5 minutes and then at 200° F. (90° C.) for 10 minutes. The carrier sheet was stripped away and the retroreflective sheet/fabric laminate cured at 300° F. (150° C.) for 5 minutes.

The resulting product had a brilliant white appearance and was very supple with an excellent hand. It had a reflectivity of 235 candella per square meter per lux, and good angularity as shown in Table 1 where the reflectivity at each indicated entrance angle is indicated in candella per square meter per lux. The half brightness entrance angle is seen to be between 40° and 50°.

TABLE 1

| Entrance Angle | Reflectivity |
|---|---|
| 4° | 235 |
| 10° | 231 |
| 20° | 196 |
| 30° | 160 |
| 40° | 138 |
| 50° | 90 |

A sample washed as described in Example 2 retained a reflectivity of about 120 candella per square meter per lux. Similar results were obtained with another sample after 25 standard drycleaning cycles with perchloroethylene.

EXAMPLE 7

A monolayer of microspheres was embedded in a carrier sheet and vapor coated with a layer of $Na_3AlF_6$ and a layer of ZnS as described in Example 1.

A binder/nacreous pigment dispersion comprising:

| Component | Parts by Weight |
|---|---|
| Acryloid B-72 (a solid film forming methyl methacrylate polymer, available from Rohm and Haas Co.) | 25.0 |
| C10LV (a solid film forming thermoplastic ethyl acrylate polymer, available from Rohm and Haas Co.) | 6.0 |
| Paraplex G-62 (an epoxidized soybean oil plasticizer, available from Rohm and Haas Co.) | 6.0 |
| VCG 630 | 29.0 |
| Toluene | 34.0 | was knife coated thereon at a wet thickness of approximately 8 mils (200 microns). The sheet was dried at 150° F. (65° C.) for 10 minutes and at 200° F. (90° C.) for 5 minutes.

Ninety three parts of a copolymer of 2-methyl butyl acrylate and acrylic acid (having a monomer weight ratio of 90/10) were combined with 7.0 parts of OR-600 to yield a white pigment adhesive composition which was knife coated onto a 0.5 mil (12 micron) thick polyester terephthalate film at a wet thickness of approximately 1.5 mils (35 microns). The adhesive coated polyester film was laminated to the nacreous pigment coated face of the sheet by passing the laminate through a steel roll laminator under approximately 10 pounds per square inch (70×10³ Newtons per square meter) pressure, and then the polyethylene-coated paper carrier sheet was stripped away.

A 3 mil (75 microns) thick biaxially oriented polymethyl methacrylate film was laid across the exposed microspheres, and the sheet was then passed between a heated (about 300° F./150° C.) steel embossing roll and an unheated rubber roll (in contact with the polymethyl methacrylate film). The embossing roll had a patterned surface consisting of raised walls approximately 1/32 inch (0.8 millimeter) high and 1/64 inch (0.4 millimeter) wide, which defined hexagonal shaped openings approximately 1.8 inch (3.2 millimeters) wide. Sufficient nip pressure was used to cause the adhesive to extrude into firm adherent contact with the polymethyl methacrylate cover film in the hexagonal pattern of the raised walls on the surface of the embossing roll. The areas where the adhesive was bonded to the cover film comprised between about 25 to 40 percent of the total surface area of the sheet and it is believed that many of the microspheres in these areas were substantially completely surrounded by the adhesive and therefore did not possess the necessary optical relationships to provide effective retroreflection.

The resulting construction was a flexible, encapsulated retroreflective sheet having a brilliant white appearance and a reflectivity of about 150 candella per square meter per lux.

EXAMPLE 8

A carrier sheet comprising a polystyrene-coated, 64 pound kraft paper was knife coated with Aroplaz 6006-X-50 (a short oil soya alkyd resin solution available from Ashland Chemical Company of Columbus, Ohio) to a wet thickness of 3 mils (75 microns) and dried at 150° F. (65° C.) for 3 minutes to yield a tacky surface. Glass microspheres having a refractive index of about 2.18 and an average diameter of about 68 microns were cascaded in a monolayer onto the tacky surface arranged in essentially their closest cubic arrangement and embedded to about 20 percent of their diameter. The construction was then dried at 300° F. (150° C.) for 4 minutes.

A spacer layer was provided by coating the exposed sides of the microspheres with the following resin solution:

| Component | Parts by Weight |
|---|---|
| Butvar B-76 (a polyvinyl butyral resin, available from Monsanto Chemical Company) | 17.6 |
| Aroplaz 1351 (a pure long oil type alkyd resin, available from Ashland Chemical Company) | 2.3 |
| Beckamine P-138 (a 60 percent solids solution of urea formaldehyde polymer in xylol, available from Riechhold Chemicals, Inc. of Pensacola, Florida) | 6.7 |
| Ethylene Glycol Monobutyl Ether | 23.7 |
| Penola 100 (a hydrocarbon solvent mixture of about 96 percent aromatic and 4 percent aliphatic compound, available from Shell Chemical Corp.) | 49.5 |
| Triethyl Amine | 0.2 | to a wet thickness of about 6 mils (150 microns). The construction was then dried, in sequence, at 200° F. (90°) for 1 minute, at 230° F. (110° C.) for 1 minute, at 320° F. (160° C.) for 1 minute, and at 375° F. (190° C.) for 5 minutes. The spacer layer had thickness of about 0.5 mil (12 microns) and conformed essentially to the contour of the microspheres.

The back surface of the spaced layer was then vacuum vapor coated with a layer of ZnS having a refractive index of about 2.35 and an optical thickness of about one-quarter wavelength for light at a wavelength of 5900 angstroms.

The dielectric coated surfaces of the microspheres were then coated to a wet thickness of 5 mils (125 microns) with the binder/nacreous pigment dispersion used in Example 1 and dried as described therein.

A layer of the adhesive composition used in Example 6 was then knife coated at a wet thickness of 4 mils (100 microns) and the construction dried at 150° F. (65° C.) for 5 minutes and at 200° F. (90° C.) for 5 minutes.

After the polystyrene-coated paper carrier sheet was removed, the front surfaces of the microspheres remained embedded in the alkyd resin layer, thereby giving the sheet, which had a brilliant white color and appearance, a flat surface. The sheet retained its retroreflective properties when wet and was thus suitable for use in outdoor applications, such as a traffic sign.

COMPARATIVE EXAMPLE 1

Microspheres having a refractive index of about 1.93 were embedded in a monolayer in a carrier sheet and vacuum vapor coated with a layer of $Na_3AlF_6$ as described in Example 1, then vacuum vapor coated with $Bi_2O_3$ having a refractive index of about 2.35.

A slurry comprising:

| Component | Parts by Weight |
|---|---|
| OR-600 | 7.9 |
| Estane 5703 | 10.3 |
| Vinylite VMCH | 7.9 |
| Methyl Ethyl Ketone | 29.6 |
| N,N—dimethylformamide | 35.2 | was knife coated over the microspheres at approximately 10 mils (250 microns) wet thickness and cured at 150° F. (65° C.) for 5 minutes and 200° F. (95° C.) for 12 minutes.

A white-pigmented adhesive layer comprising:

| Component | Parts by Weight |
|---|---|
| OR-600 | 7.9 |
| Estane 5702 | 3.4 |
| Dioctyl Phthalate (plasticizer) | 14.6 |
| Vinylite VAGH | 18.7 |
| Methyl Ethyl Ketone | 25.7 |
| N,N—dimethylformamide | 7.2 | was knife coated over the slurry at approximately 6 mils (150 microns) wet thickness and dried at 150° F. (65° C.) for 3 minutes and at 200° F. (95° C.) for 10 minutes. The construction was then hot laminated at 30 psi (2.1 kg/cm²) and 210° F. (100° C.) to an adhesive-coated cotton cloth, the adhesive being a plasticized vinyl chloride-vinyl acetate copolymer (87/13 weight ratio).

After the polyethylene coated paper carrier sheet was removed, the resultant cloth which had a white appearance was measured to have a reflectivity of 140 candella per square meter per lux.

COMPARATIVE EXAMPLE 2

Glass microspheres having a refractive index of about 1.93 and diameters ranging from about 45 to about 70 microns were cascaded in a monolayer onto a carrier sheet comprising a web of paper coated on one side with low density polyethylene. The microspheres, which were packed in essentially their closest cubic arrangement, were embedded in the polyethylene to a depth of approximately 30 percent of their diameters by heating the web to 280° F. (140° C.).

The binder/nacreous pigment dispersion of the following formulation:

| Component | Parts by Weight |
|---|---|
| Estane 5703 | 15.0 |
| Vinylite VMCH | 4.5 |
| VCG 630 | 15.5 |
| Methyl Ethyl Ketone | 27.0 |
| Cyclohexanone | 10.0 |
| Toluene | 28.0 | was knife coated over the monolayer of microspheres at approximately 5 mils (125 microns) wet thickness. This construction was dried at 150° F. (65° C.) for 5 minutes and at 200° F. (90° C.) for 10 minutes.

An adhesive layer comprising:

| Component | Parts by Weight |
|---|---|
| Rhoplex HA-8 | 92.13 |
| Foamaster DF 160L | 0.25 |
| Acrysol ASE 60 | 2.21 |
| Ammonium Nitrate | 0.51 |
| Ammonium Hydroxide | 0.30 |
| Water | 4.60 | was applied over the binder layer at a wet thickness of approximately 14 mils (350 microns). The sheet was then dried at 90° F. (30° C.) for 4 minutes to a tacky state then laminated directly to a cotton/polyester (35%/65%) blend broadcloth before being further dried at 150° F. (65° C.) for 5 minutes and then 250° F. (120° C.) for 10 minutes.

The temporary carrier sheet was removed to reveal a white, retroreflective sheet which was measured to have a reflectivity of 120 candella per square meter per lux.

Various modifications and alterations of this invention will become apparent to those skilled in the art without departing from the scope and spirit of this invention.

What is claimed is:

1. A retroreflective sheet comprising:
   (A) a monolayer of transparent microspheres having a refractive index $n_2$; and
   (B) transparent specular reflectors associated with said microspheres in optical connection therewith, said specular reflectors comprising a transparent layer of refractive index $n_1$, the faces of said layer being in contact with materials of refractive index $n_2$ and $n_3$, wherein $n_2$ and $n_3$ are both at least 0.1 either higher or lower than $n_1$, said transparent layer having an optical thickness corresponding to an odd numbered multiple of about one quarter wavelength of light in the wavelength range of about 3,800 to 10,000 angstroms; partially embedded in
   (C) a base layer comprising a substantially transparent binder material and reflective nacreous pigment flakes which are arranged about the embedded portion of said microspheres and said specular reflectors in approximately tangential orientation thereto.

2. A sheet as defined in claim 1 further comprising:
   (D) a transparent spacer layer disposed between said microspheres and said transparent specular reflectors; and
   (E) a flattop transparent layer in which the front surfaces of said microspheres are embedded.

3. A sheet as defined in claim 1 wherein said microspheres are glass.

4. A sheet as defined in claim 1 wherein said microspheres have a refractive index between about 1.4 and about 2.7.

5. A sheet as defined in claim 4 wherein said microspheres have a refractive index between about 1.8 and 2.0.

6. A sheet as defined in claim 5 wherein said microspheres have a refractive index of about 1.91.

7. A sheet as defined in claim 1 wherein said microspheres have an average diameter between about 30 and about 150 microns.

8. A sheet as defined in claim 7 wherein said microspheres have an average diameter between about 60 and about 75 microns.

9. A sheet as defined in claim 1 wherein said base layer further comprises a coloring agent incorporated in said transparent binder material.

10. A sheet as defined in claim 1 wherein said reflective nacreous pigment flakes have a thickness less than about 200 millimicrons, and have a maximum dimension which falls within the range of about 5 to about 80 microns, inclusive, which is less than the diameter of said microspheres.

11. A sheet as defined in claim 10 wherein said maximum dimension is between about 8 and about 30 microns, inclusive, and said thickness is between about 30 and about 60 millimicrons.

12. A sheet as defined in claim 1 wherein the concentration of said reflective nacreous flakes is at least about 15 percent by weight of the total solids in said base layer.

13. A sheet as defined in claim 1 wherein reflective nacreous pigment flakes conform to the contours of said microspheres and said specular reflectors in cup-like fashion.

14. A sheet as defined in claim 1 wherein said reflective nacreous pigment flakes are transparent.

15. A sheet as defined in claim 1 wherein
   (1) said microspheres are glass, have a refractive index between about 1.8 and 2.0 and have an average diameter between about 30 and 150 microns;
   (2) said base layer further comprises a coloring agent incorporated in said transparent binder material;
   (3) said reflective nacreous pigment flakes have a maximum dimension which falls within the range between about 8 and 30 microns, inclusive, which is less than the diameter of said microspheres, and have a thickness between about 30 and 60 millimicrons, and conform to the contours of said microspheres and said specular reflectors in cup-like fashion.

16. A sheet as defined in claim 1 further comprising:
   (D) a layer of adhesive disposed on the side of said base layer opposing said monolayer microspheres.

17. A sheet as defined in claim 16 which is adhesively bonded to a fabric.

18. A sheet as defined in claim 1 further comprising:
(D) a cover film disposed in spaced arrangement in front of said microspheres; and
(E) a network of narrow intersecting bonds extending between said cover film and said base layer to adhere said cover film and said base layer together and form a plurality of cells within which microspheres are hermetically sealed.

* * * * *

UNITED STATES PATENT AND TRADEMARK OFFICE
CERTIFICATE OF CORRECTION

PATENT NO. : 4,763,985
DATED : August 16, 1988
INVENTOR(S) : Wallace K. Bingham

It is certified that error appears in the above-identified patent and that said Letters Patent is hereby corrected as shown below:

Front Page:

In the Title "ENHANCER" should be --ENHANCED--.

In the Specification:

Col. 6, line 22 "qualities" should be --quantities--.

Col. 8, line 13 after the word "shown" insert --.--.

In the Claims:

Col. 18, line 46 after the word "wherein" insert --said--.

Signed and Sealed this

Thirteenth Day of December, 1988

Attest:

DONALD J. QUIGG

Attesting Officer

Commissioner of Patents and Trademarks